US011675955B1

(12) United States Patent
Liu et al.

(10) Patent No.: US 11,675,955 B1
(45) Date of Patent: Jun. 13, 2023

(54) ROUTING USING RULE-BASED BLOCKAGE EXTENSION

(71) Applicant: Cadence Design Systems, Inc., San Jose, CA (US)

(72) Inventors: Derong Liu, Austin, TX (US); Gracieli Posser, Austin, TX (US); Mehmet Can Yildiz, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 170 days.

(21) Appl. No.: 17/303,052

(22) Filed: May 19, 2021

(51) Int. Cl.
*G06F 30/394* (2020.01)
*G06F 30/398* (2020.01)

(52) U.S. Cl.
CPC .......... *G06F 30/394* (2020.01); *G06F 30/398* (2020.01)

(58) Field of Classification Search
CPC .. G06F 30/394; G06F 30/398; G06F 2119/18; G06F 30/392; G06F 2111/04; G06F 2119/12; G06F 2111/08; G06F 30/33; G06F 30/367; G06F 2115/08; G06F 30/30; G06F 30/3323; G06F 30/39; G06F 2111/12; G06F 30/18; G06F 30/327; G06F 30/3947; G06F 30/3953; G06F 30/396; G06F 16/9537; G06F 16/958; G06F 16/972; G06F 30/00; G06F 16/21; G06F 11/2094; G06F 21/568; G06F 3/00; G06F 3/011; G06F 3/0338; G06F 3/0346; G06F 3/03547; G06F 3/0482; G06F 7/58; G06F 7/582; G06F 8/20; G06F 8/456; G06F 8/76; G06F 9/4406; G06F 9/451; G06F 9/453; G06F 9/54; G03F 1/36; H01L 27/0207; H01L 27/0924; H01L 2225/06544; H01L 27/0688; H01L 27/14665
USPC .................................................. 716/126–131
See application file for complete search history.

(56) References Cited

U.S. PATENT DOCUMENTS

| | | | |
|---|---|---|---|
| 7,653,892 B1* | 1/2010 | Gennari | G06F 30/39 716/50 |
| 2012/0144355 A1* | 6/2012 | Dai | G06F 30/398 716/112 |
| 2013/0074024 A1* | 3/2013 | Chase | G06F 30/398 716/112 |

* cited by examiner

*Primary Examiner* — Binh C Tat
(74) *Attorney, Agent, or Firm* — Schwegman Lundberg & Woessner, P.A.

(57) ABSTRACT

Various embodiments provide for routing a net of a circuit design using rule-based routing blockage extension, which may be part of electronic design automation (EDA). In particular, some embodiments route a net of a circuit design by determining a dimension extension value based on a design rule of the circuit design and applying the dimension extension value to at least one existing routing blockage.

20 Claims, 14 Drawing Sheets

US 11,675,955 B1

ROUTING USING RULE-BASED BLOCKAGE EXTENSION

TECHNICAL FIELD

Embodiments described herein relate to circuit design and, more particularly, to systems, methods, devices, and instructions for routing a net of a circuit design using rule-based blockage extension, which may be part of electronic design automation (EDA).

BACKGROUND

Electronic design automation (EDA) software systems commonly perform routing of networks of circuit designs, such as clock networks (hereafter, clock nets). Usually, net routing can be performed in two phases, where the first phase involves routing guides that attempt to generate timing-aware/timing-based global routing of nets, and the second phase involves detailed routing of nets with specific wires (e.g., metal traces) based on the routing guides, while attempting to resolve/avoid one or more design rule violations.

During global routing, a circuit design can be divided into a plurality of grid cells (Gcells) on each layer of the circuit design, and networks of the circuit design can be routed through individual grid cells based on their respective routing resources (e.g., routing capacity). Existing blockages (among other elements) within a circuit design can reduce routing resources (e.g., routing capacity) of the individual grid cells. As a result of the reduced routing resources, a routing process generally avoids routing a network (e.g., wire) through an existing blockage of the circuit design. However, this can also result in zig-zag routing within the circuit design, inaccurate congestion estimation of the circuit design, or both based on lack of routing resources.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
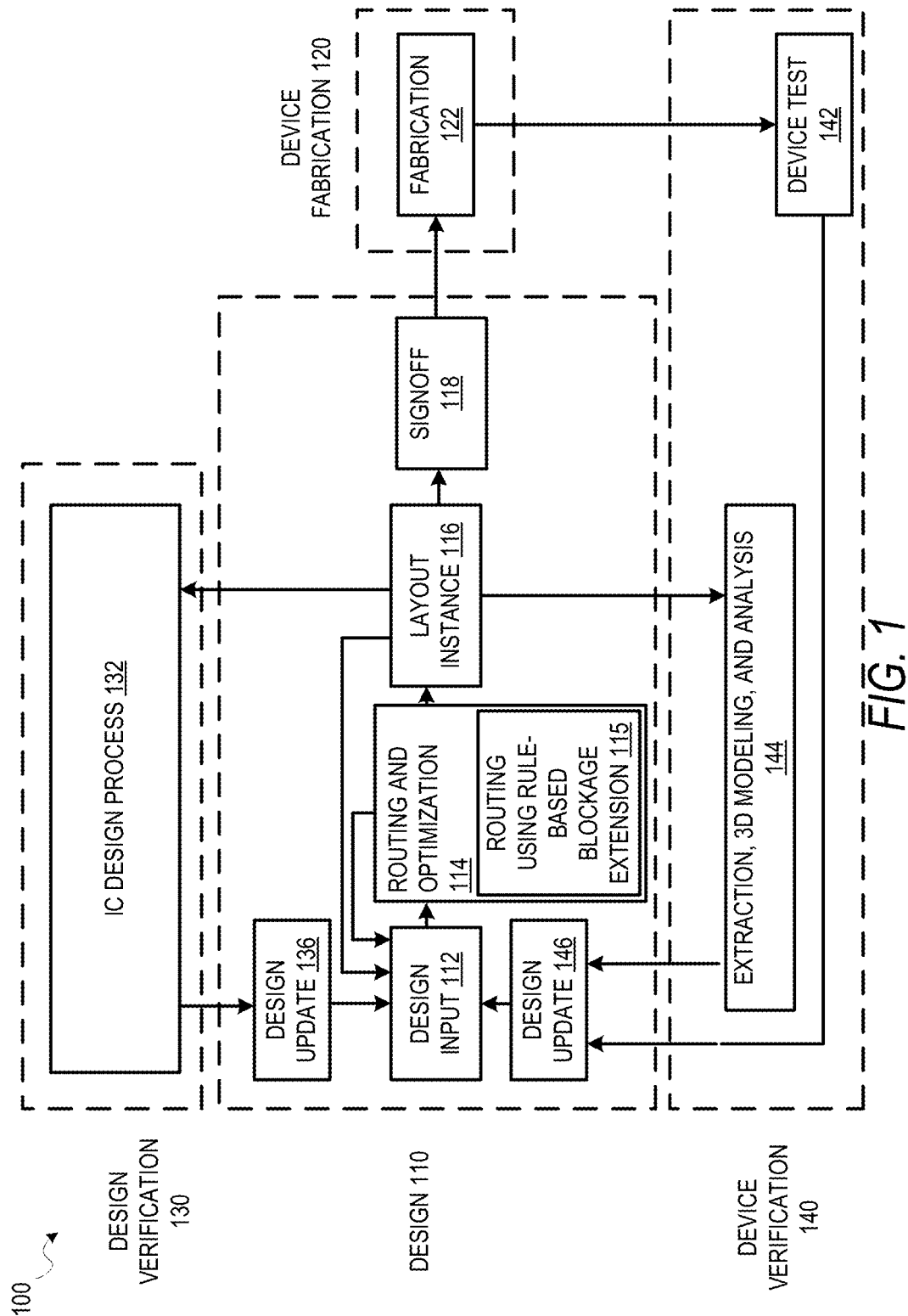
FIG. 1 is a diagram illustrating an example design process flow for circuit design routing using rule-based routing blockage extension, according to some embodiments.

Various embodiments provide for routing a net of a circuit design using rule-based routing blockage extension, which may be part of electronic design automation (EDA). More particularly, some embodiments route a net of a circuit design (e.g., clock net) by determining a dimension extension value (e.g., for an individual layer) based on a design rule of the circuit design and applying the dimension extension value to at least one existing routing blockage (e.g., of the individual layer). For instance, the dimension extension value can be applied to at least one existing routing blockage by merging two or more routing blockages (e.g., on the individual layer) based on the dimension extension value.

Generally, circuit designs can comprise several routing blockages of different shapes, which can often impact routing and congestion estimation. Specifically, when there is an existing blockage in a circuit design, conventional technologies avoid routing any wires within the blockage. This, however, can result in zig-zag routing and inaccurate congestion estimation, due to the lack of routing resources.

Various embodiments described herein provide a method for rule-based routing blockage merging (e.g., closure), which can achieve straight routing and improve congestion estimation over conventional technologies. For instance, some embodiments close the routing resources around routing blockages based on the design rules. In doing so, the gaps that remain around routing blockages are completely closed or rendered smaller and only able to fit very small wire segments. Such gaps can cause a routing process (e.g., routing engine) to select straighter routing patterns for wires, rather than a zig-zagging routing pattern around routing blockage, within a circuit design. This, in turn, can improve (e.g., increase accuracy of) congestion estimation by the routing process.

Depending on the embodiment, the methodologies described herein can be performed prior to global routing, or in whole or in part during of global routing, performed on a circuit design.

As used herein, global routing can comprise determining one or more routing guides (also referred to as "guides") for routing a physical wire (e.g., interconnect line or wire) within a circuit design between at least two nodes of circuit design (e.g., two pins or a source and a pin). A routing guide can serve as a "loose" routing path or routing area within which detailing routing can route a physical write between two nodes (e.g., pins) of a circuit design. A routing guide for a clock network of a circuit design can be referred to as a "clock routing guide." According to various embodiments, global routing considers/accounts for one or more routing blockages (blockages) of the circuit design when determining one or more guides between nodes of the circuit design. The output of performing global routing on a circuit design can comprise a capacity map for the circuit design that describes or defines one or more routing resources for routing wires between nodes of the circuit design. A capacity map can comprise a grid describing the routing capacity of a routing area. Accordingly, a capacity map can quantify a capacity of a given routing guide/path/area of a circuit design (as determined by global routing) to have a physical wire routed through the given routing guide/path/area. A capacity map can be used during global routing to determine where it routes a network of a circuit design (using a set of routing guides), while avoiding routing a network through grid not having sufficient capacity.

As used herein, detailed routing can comprise routing a physical wire (e.g., interconnect wire) within a circuit design, between at least two nodes of the circuit design, based on one or more guides determined by global routing for the circuit design. The one or more guides provided by global routing can provide detailed routing process with a topology for routing wires, which in turn can enable detailed routing to route wires without violating one or more design rule constraints (DRCs) associated with a circuit design. This can be referred to as detailed routing being performed with clean DRCs. Accordingly, for some embodiments, global routing is performed on a circuit design prior to detailed routing being performed on the circuit design. Generally, global routing can be performed on a circuit design faster than performing detailing routing on the same circuit design. The routed wires of a circuit design can form a network (also referred to as a "net") of the circuit design.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for circuit design routing using rule-based routing blockage extension, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. As shown, the routing and optimization 114 operation includes routing using rule-based blockage extension 115 operation, which may be performed in accordance with various embodiments described herein. For some embodiments, routing during the routing and optimization 114 operation comprises a global routing (e.g., global routing phase) and a detailed routing (e.g., detailed routing phase), and the routing using rule-based blockage extension 115 operation is performed prior to or as an initial part of the global routing phase. The routing using rule-based blockage extension 115 can generate data described modified (e.g., extended or merged) routing blockages that is used by the global routing phase to generate one or more routing guides/path/areas (e.g., assign a wire/wire segment to a layer of a circuit design and then generate the one or more routing guides/path/areas). The detailed routing phase (for routing wires or wire segments) can be performed based on the one or more routing guides/path/areas generated by the global routing phase, and based on the modified routing blockages.

While the design process flow 100 shows optimization occurring prior to a layout instance 116, routing (e.g., the routing using rule-based blockage extension 115 operation), timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on integrated circuit (IC) design process 132 operations or extraction, 3D modeling, and analysis 144 operations. Once the device is generated, the device can be tested as part of device test 142 operations, and layout modifications generated based on actual device performance.

As described in more detail below, a design update 136 from the IC design process 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

FIGS. 2 through 7 are flowcharts illustrating example methods for routing a net of a circuit design using rule-based routing blockage extension, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 2:
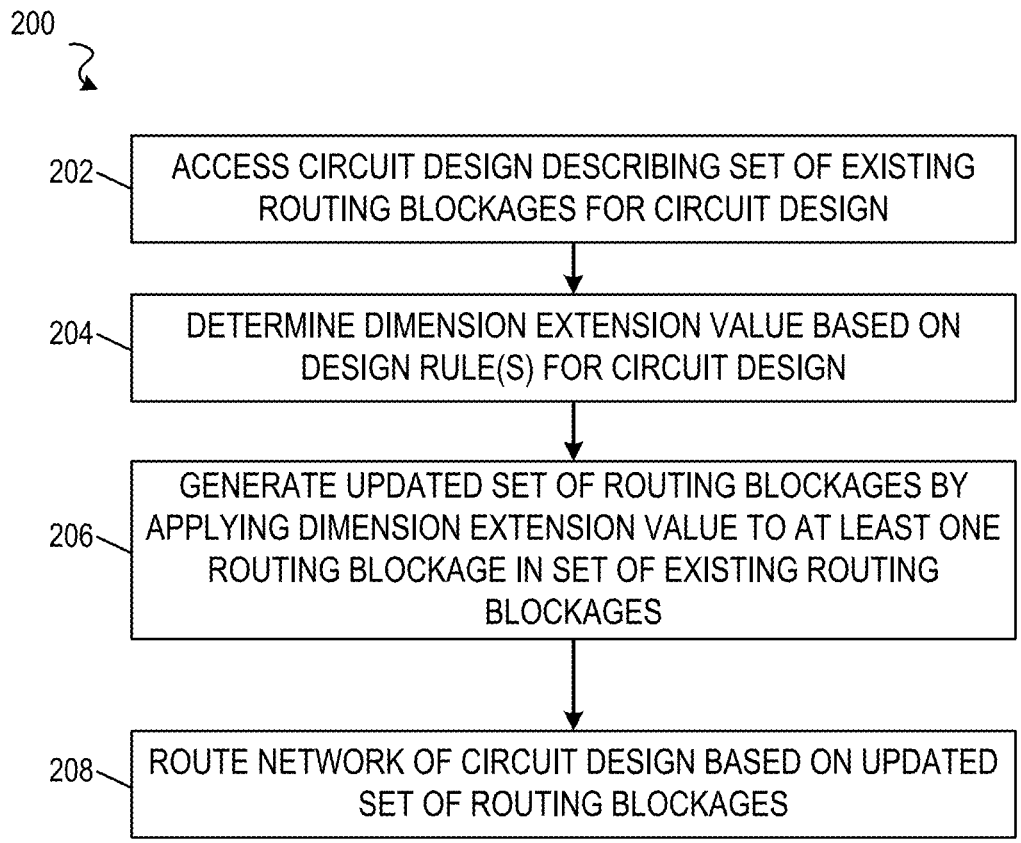
FIGS. 2 through 7 are flowcharts illustrating example methods for routing a net of a circuit design using rule-based routing blockage extension, according to some embodiments.

Referring now to FIG. 2, the flowchart illustrates the example method 200 for routing a net of a circuit design using rule-based routing blockage extension, according to some embodiments. For some embodiments, the method 200 is performed as part of a routing process applied to a circuit design (e.g., by an EDA software system). For some embodiments, at least some portion of the method 200 is performed on a circuit design layer by layer. An operation of the method 200 (or another method described herein) may be performed by a hardware processor (e.g., central processing unit or graphics processing unit) of a computing device (e.g., desktop, server, etc.).

As illustrated, operation 202 accesses circuit design data describing an existing set of routing blockages of a circuit design. For instance, the circuit design data can describe an existing set of routing blockages on an individual layer (e.g., a first layer of a plurality of layers) of the circuit design. The existing set of routing blockages on the individual layer can comprise, for example, at least one power ground blockage. For various embodiments, the existing set of routing blockages comprises any type of blockage. The circuit design data can be stored as part of a circuit design (e.g., IC circuit design) stored in memory (e.g., input design file for the circuit design).

At operation 204, a dimension extension value (e.g., dimension extension length) is determined based on a set of design rules for the circuit design. For example, a dimension extension value can be determined for the individual layer based on a set of design rules for the circuit design. For some embodiments, the design rules used are applicable to all of the circuit design, applicable to the individual layer, or some combination both. The design rules can be provided, for example, by design rule constraints (DRCs) associated with the circuit design. According to some embodiments, determining the dimension extension value for the individual layer (based on the set of design rules) comprises determining a minimum extension value for the individual layer based on the set of design rules. For some embodiments, determining the minimum extension value for the individual layer (based on the set of design rules) comprises determining the minimum extension value based on a minimum area of the individual layer and a wire width for the individual layer. Depending on the embodiments, the set of design rules can define at least one of the minimum area of the individual layer or the wire width for the individual layer. Based on the minimum extension value and a predetermined multiplier, the dimension extension value for the individual layer can be determined. The predetermined multiplier can be, for example, provided by a user (such as a user of an EDA tool that implements the method 200). Additionally, the predetermined multiplier can be pre-configured by the EDA developer. The predetermined multiplier can be determined by testing or trial and error.

Subsequently, at operation 206, an updated set of routing blockages is generated. For example, an updated set of routing blockages on the individual layer can be generated. For some embodiments, operation 206 comprises applying the dimension extension value (determined by operation 204) for the individual layer to at least one routing blockage in the existing set of routing blockages on the individual layer. For various embodiments, the direction in which an existing routing blockage is extended depends on the direction of the individual layer. For instance, where the individual layer is comprises vertical tracks for routing wires, the dimensions extension value can be applied to an existing routing blockage of the individual layer in the vertical direction. Alternatively, where the individual layer is comprises horizontal tracks for routing wires, the dimensions extension value can be applied to an existing routing blockage of the individual layer in the horizontal direction. According to some embodiments, applying the dimension extension value (for the individual layer) to the at least one routing blockage in the existing set of routing blockages (on the individual layer) comprises merging two or more routing blockages within the existing set of routing blockages based on the dimension extension value for the individual layer. As result of this merging, the updated set of routing blockages (on the individual layer) can be generated.

For some embodiments, merging two or more routing blockages (within the existing set of routing blockages) based on the dimension extension value comprises: generating a sorted set of routing blockages on the individual layer. This can be achieved, for example, by sorting the existing set of routing blockages on the individual layer based on locations of routing blockages on the individual layer. Then, in the sorted set of routing blockages on the individual layer, a series of routing blockages is identified where adjacent routing blockages in the series are aligned and within a distance (e.g., a predetermined distance) of the dimension extension value. To be aligned, two adjacent routing blockages need not be the same height. Where two routing blockages have different heights, some embodiments can use the routing blockage that is smaller in height as the blockage extension. After the series of routing blockages is identified, various embodiments merge together (the individual routing blockages in) the series of routing blockages to form a merged routing blockage in the updated set of routing blockages on the individual layer. For various embodiments, the merged routing blockage takes the place of the series of routing blockages in the updated set of routing blockages.

For some embodiments, as operations 204 and 206 are performed with respect to different, individual layers of the circuit design, each of those individual layers has its own (layer-specific) individual dimension extension value determined (by operation 204) based on a set of design rules for the circuit design applicable to the individual layer (e.g., based on the characteristics of the individual layer). Additionally, for some embodiments, each of those individual layers has its own (layer-specific) updated set of routing blockages generated (by operation 206), where operation 206 applies the corresponding (layer-specific) individual dimension extension value of the individual layer to at least one routing blocking in an existing set of routing blockages on the individual layer.

Eventually, operation 208 routes a network of the circuit design based on the updated set of routing blockages (e.g., on the individual layer) generated by operation 206. For some embodiments, operations 202 through 206 are performed with respect to multiple layers (e.g., performed for each layer) of the circuit design prior to operation 208 being performed. During operation 208, a plurality of grid cells for the individual layer can be generated (e.g., by a global routing process), and a set of routing capacities for the set of grid cells can be determined based on the updated set of routing blockages on the individual layer. Thereafter, the network of the circuit design can be routed (e.g., by the global routing process) based on the updated set of routing capacities.

Figure 3:
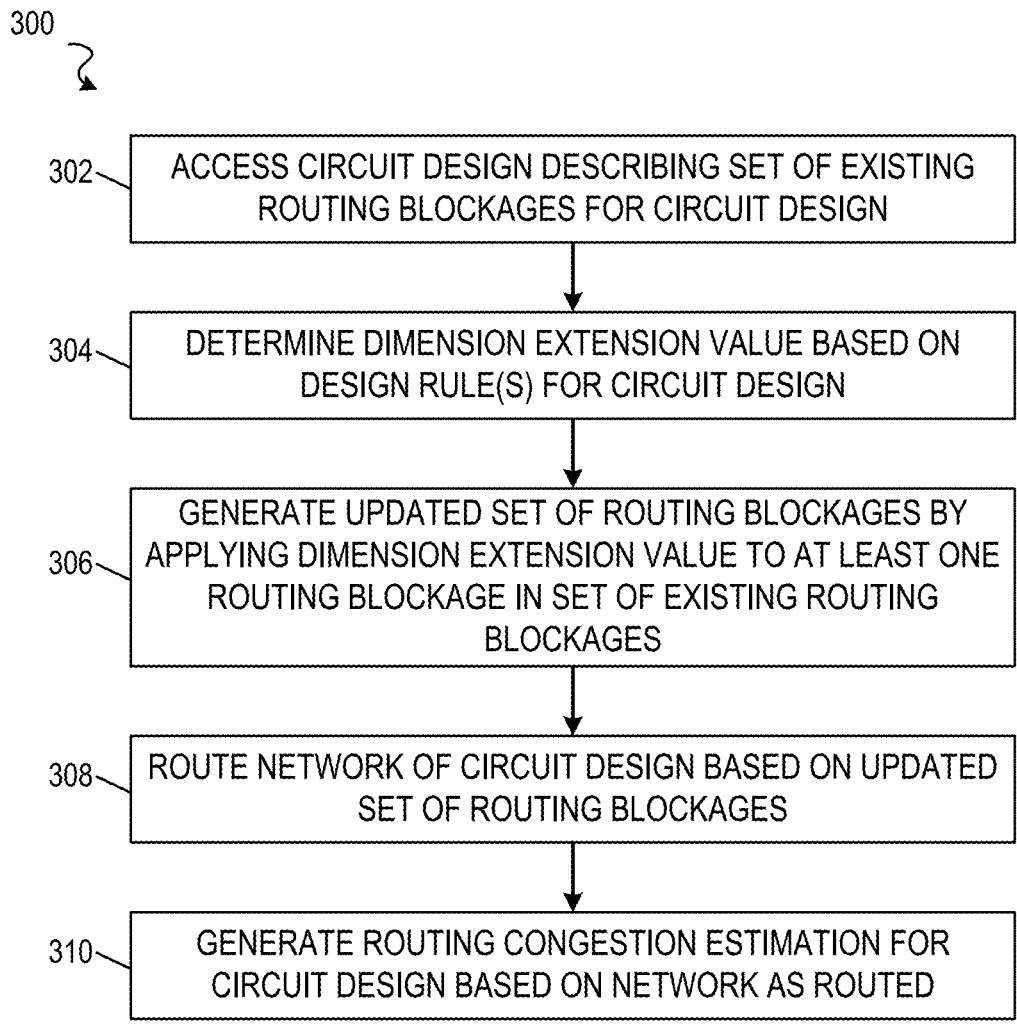

Referring now to FIG. 3, the flowchart illustrates an example method 300 for routing a net of a circuit design using rule-based routing blockage extension, according to some embodiments. Like the method 200 of FIG. 2, the method 300 may be performed as part of a routing process applied to a circuit design, and at least some portion of the method 300 is performed on a circuit design layer-by-layer. An operation of the method 300 may be performed by a hardware processor.

The method 300 comprises operations 302, 304, 306, 308, which according to some embodiments, are respectively similar to operations 202, 204, 206, 208 of the method 200 described above with respect to FIG. 2. At operation 310, routing congestion estimation is generated for the circuit design based on the network as routed by operation 306.

Figure 4:
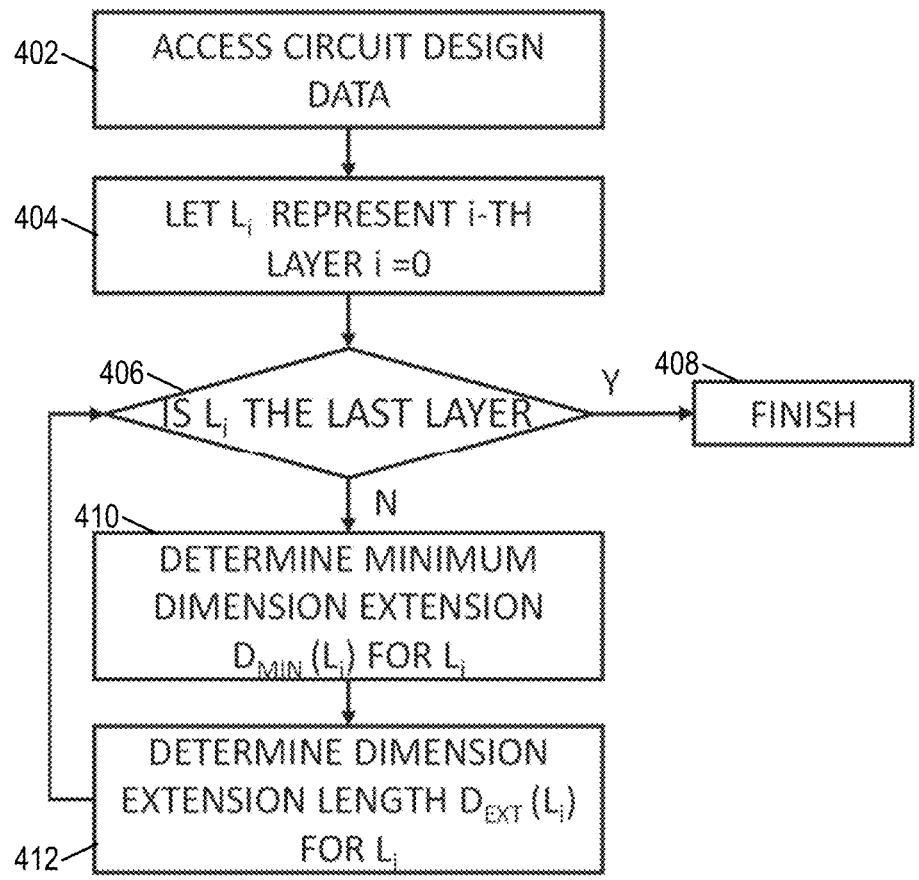

Referring now to FIG. 4, the flowchart illustrates an example method 400 for determining (e.g., calculating) a dimension extension value, according to some embodiments. For some embodiments, the method 400 is performed as part of operation 204 of the method 200 described with respect to FIG. 2. As shown, operation 402 accesses circuit design data that describes one or more layers of a circuit design. At operation 404, the method 400 starts with 0th layer ($L_0$) of the circuit design by setting variable i=0. Thereafter, operation 406 determines whether the current i-th layer (represented by $L_i$) of the circuit design is the last layer of the circuit design. If yes, the method 400 finishes at operation 408, otherwise the method 400 proceeds to operation 410. A minimum dimension extension $D_{MIN}(L_i)$ for the i-th layer $L_i$ of the circuit design is determined (e.g., calculated) at operation 410. According to some embodiments, the minimum dimension extension $D_{MIN}(L_i)$ is determined by the following Equation 1:

$$D_{MIN}(L_i) = \text{Min\_Area}(L_i)/\text{Wire\_Width}(L_i),$$

where the minimum area Min_Area($L_i$) for the i-th layer $L_i$ of circuit design, and where the wire width Wire_Width($L_i$) for the i-th layer $L_i$ of circuit design are both provided by a design rule (e.g., Design Rule Check (DRC)) for the circuit design. Examples of design rules can include, without limitation, a minimum area rule, a directional span length rule, and an end-of-line rule. Such rules can be defined in a LEF file. A DRC violation can result when a rule is not obeyed.

Subsequently, at operation 412, a dimension extension $D_{EXT}(L_i)$ for the i-th layer $L_i$ of the circuit design based on the minimum dimension extension $D_{MIN}(L_i)$ determined (e.g., calculated) by operation 410. According to some embodiments, the dimension extension $D_{EXT}(L_i)$ is determined based on $D_{MIN}(L_i)$ by the following Equation 2:

$$D_{EXT}(L_i) = MUL \times D_{MIN}(L_i),$$

where is MUL represents a multiplier value, which can be user defined.

Figure 5:
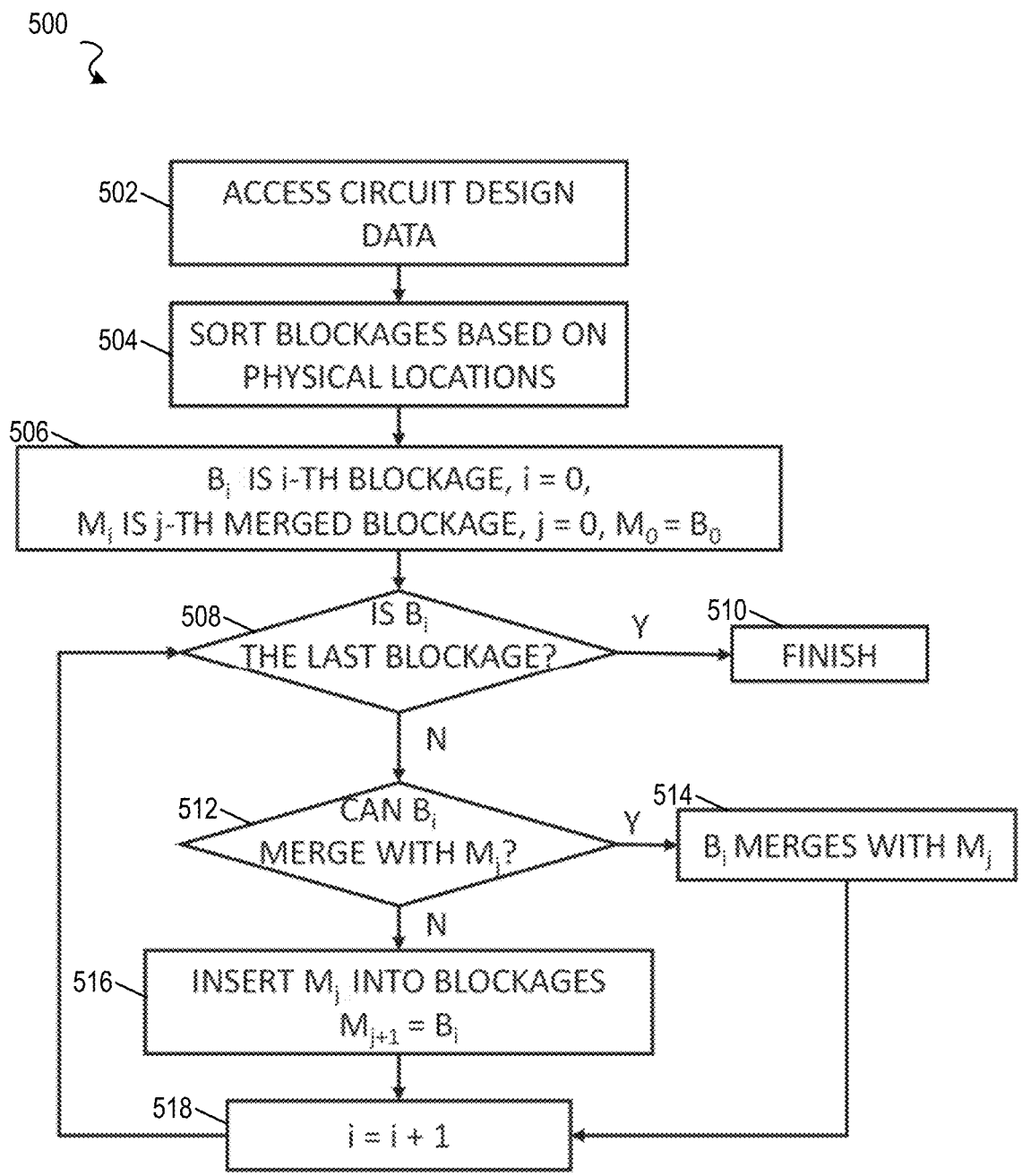

Referring now to FIG. 5, the flowchart illustrates an example method 500 for applying a dimension extension value to one or more routing blockages in an existing set of routing blockages, according to some embodiments. For some embodiments, the method 500 is performed as part of operation 206 of the method 200 described with respect to FIG. 2. For some embodiments, the method 500 results in an updated (or new) set of routing blockages by applying a dimension extension value (e.g., determined by the method 400 of FIG. 4) to one or more routing blockages in an existing set of routing blockages. Additionally, for some embodiments, the method 500 is performed with respect to each layer of the circuit design.

As shown, operation 502 accesses circuit design data that describes an existing set of routing blockages for a given layer of a circuit design, and locations of the existing set of routing blockages on the given layer. At operation 504, the method 500 sorts the existing set of routing blockages based on their physical locations (e.g., X and Y coordinates) on their respective layers.

Subsequently, operation 506 starts with 0th existing routing blockage ($B_0$) of the circuit design by setting variable i=0, starts with 0th merged routing blockage ($M_0$) of the circuit design by setting variable j=0, and starts with the 0th merged routing blockage $M_0$ being set to the 0th existing routing blockage $B_0$ (i.e., $M_0 = B_0$). Thereafter, operation 508 determines whether the current i-th existing routing blockage (represented by $B_i$) of the circuit design is the last layer of the existing routing blockages. If yes, the method 500 finishes at operation 510, otherwise the method 500 proceeds to operation 512.

Figure 10:
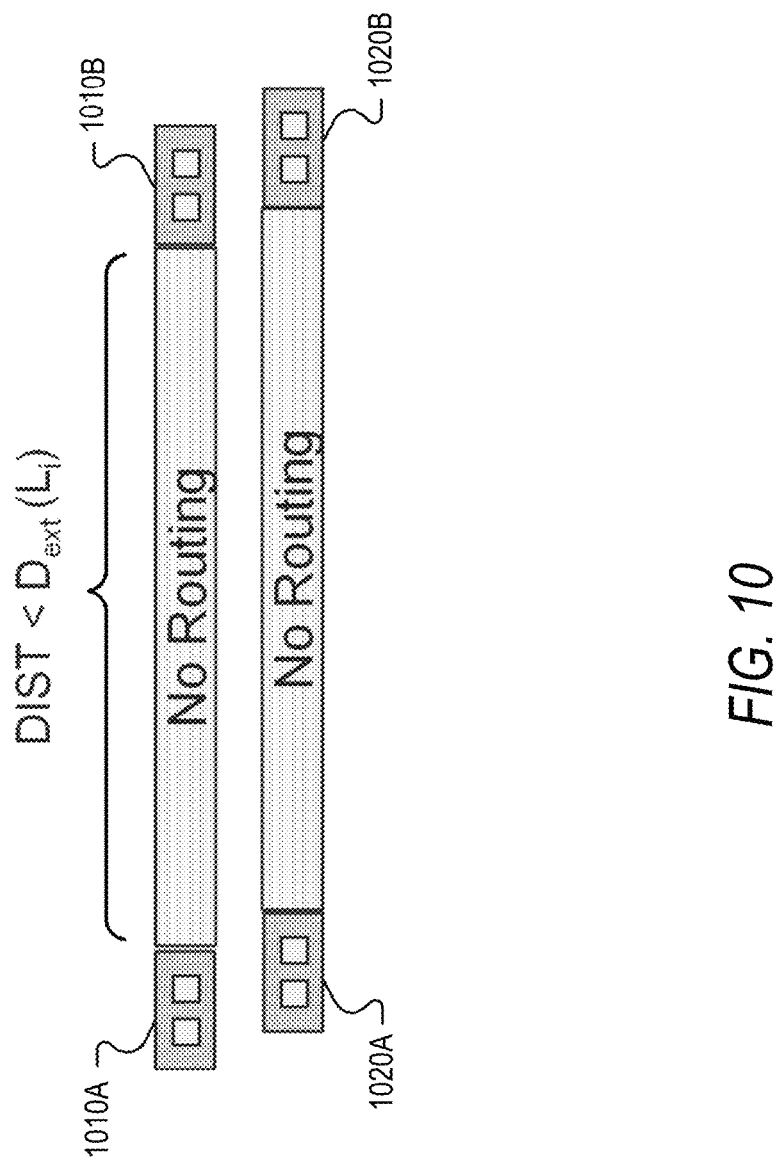
FIG. 10 is a diagram illustrating an example of applying a rule-based blockage extension to two existing routing blockages, according to some embodiments.

Operation 512 determines whether the current i-th existing routing blockage (represented by $B_i$) of the circuit design can be merged with the current j-th merged routing blockage (represented by $M_j$). For some embodiments, the existing routing blockages can be merged if the existing routing blockages are aligned within the distance of dimension extension $D_{EXT}(L_i)$. For instance, the current i-th existing routing blockage ($B_i$) and the current j-th merged routing blockage ($M_j$) can be merged if the distance between $B_i$ and $M_j$ is less than $D_{EXT}(L_i)$. FIG. 10 illustrates an example of this condition being applied.

If the current i-th existing routing blockage ($B_i$) and the current j-th merged routing blockage ($M_j$) can be merged, the method 500 proceeds with operation 514 merging the current i-th existing routing blockage ($B_i$) and the current j-th merged routing blockage ($M_j$) can be merged (e.g., thereby closing the gap between the two routing blockages). After operation 514, the method 500 proceeds to operation 518. Operation 518 increments variable i by 1 (i.e., i=i+1) and, thereafter, the method 500 returns to operation 508.

If the current i-th existing routing blockage ($B_i$) and the current j-th merged routing blockage ($M_j$) cannot be merged, the method 500 proceeds with operation 516, where the current j-th merged routing blockage ($M_j$) is inserted into the new set of routing blockages, and the current j+1-th merged routing blockage ($M_{j+1}$) is set to the current i-th existing routing blockage (Bk) (i.e., $M_{j+1} = B_i$). After operation 516, the method 500 proceeds to operation 518, where operation 518 increments variable i by 1 and the method 500 then returns to operation 508.

Figure 6:
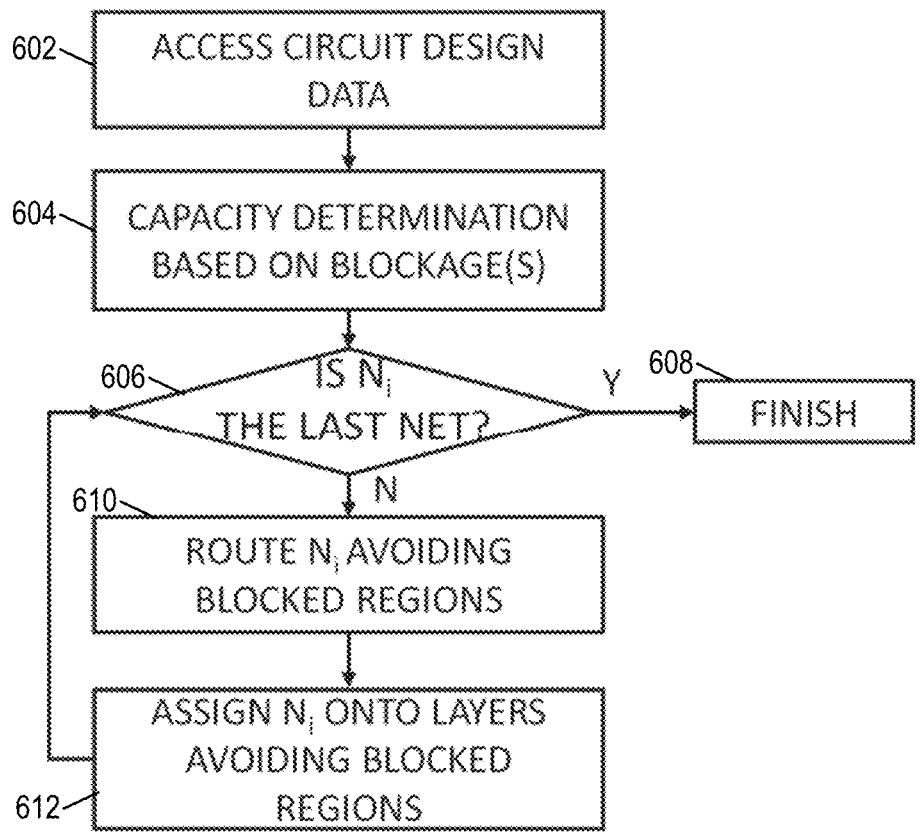

Referring now to FIG. 6, the flowchart illustrates an example method 600 for routing a network of a circuit design based on an updated set of routing blockages, according to some embodiments. For some embodiments, the method 600 is performed as part of operation 208 of the method 200 described with respect to FIG. 2. For some embodiments, the method 600 is performed after routing capacities (e.g., of Gcells of layers) of a circuit design are updated based on an updated (or new) set of routing blockages for all layers of the circuit design that results from performing the method 500 of FIG. 5.

As shown, operation 602 accesses circuit design data that describes an updated set of routing blockages (which can include merged routing blockages as described herein) for all layers of the circuit design, and physical locations (e.g., X and Y coordinates) of the updated set of routing blockages on their respective layers. At operation 604, the method 600 determines (e.g., calculates) routing capacity for each of the layers of the circuit design based on the updated set of routing blockages. Operation 606 determines whether the current i-th network of the circuit design (represented by $N_i$) of the circuit design is the last network of the circuit design to be routed. If yes, the method 600 finishes at operation 608, otherwise the method 600 proceeds to operation 610.

Operation 610 routes the current i-th network ($N_i$) by avoiding blocked regions (e.g., closed regions) of the circuit design based on the capacity determination of operation 604, and operation 612 assigns the current i-th network ($N_i$) to one or more layers of the circuit design by avoiding blocked regions of the circuit design based on the capacity determination of operation 604. Operations 608, 610, 612 represent a net-by-net routing and layer assignment of the circuit design. After operation 612, the method 600 returns to operation 606.

Figure 7:
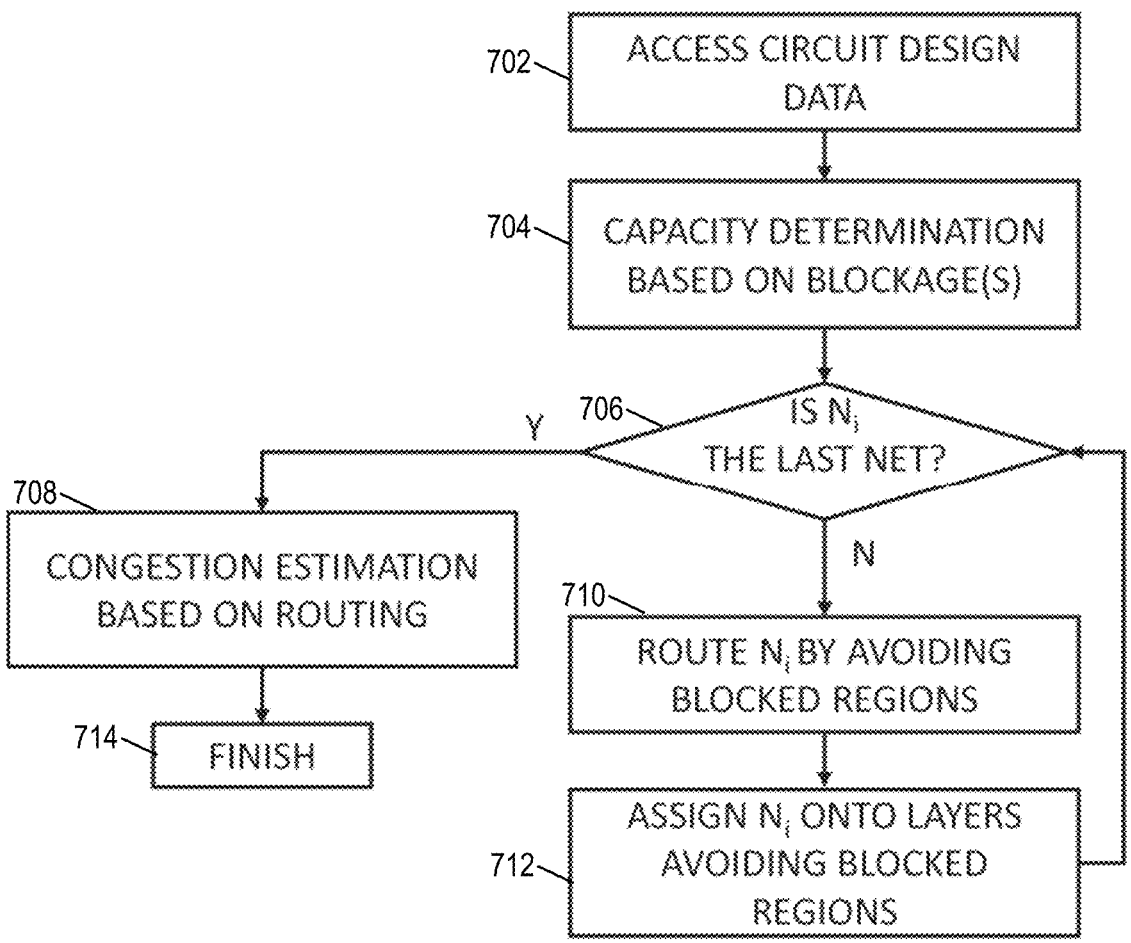

Referring now to FIG. 7, the flowchart illustrates an example method 700 for generating a routing congestion estimation for a circuit design based, according to some embodiments. For some embodiments, the method 700 is performed as part of operation 310 of the method 300 described with respect to FIG. 3. For various embodiments, operations 702, 704, 710, 712 are respectively similar to operations 602, 604, 610, 612 of the method 600 with respect to FIG. 6.

After operation 704, operation 706 determines whether the current i-th network of the circuit design (represented by $N_i$) of the circuit design is the last network of the circuit design to be routed. If yes, the method 700 proceeds to operation 708, otherwise the method 700 proceeds to operation 710. At operation 708, a congestion estimation is generated for the circuit design after one or more networks of the circuit design have been routed by operations 706, 710, and 712. After operation 708, the method 700 finishes at operation 714.

Figure 8:
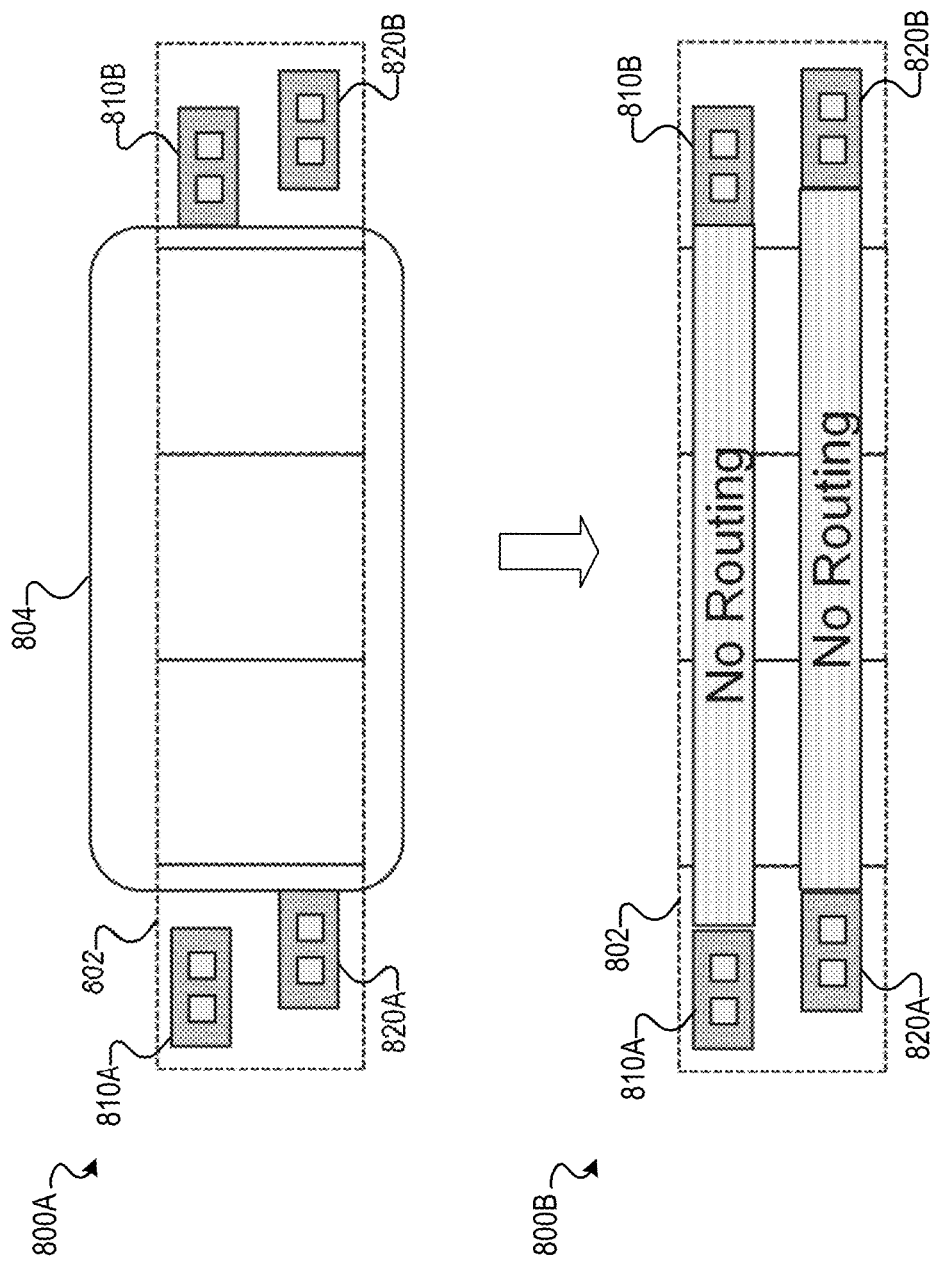
FIGS. 8 and 9 are diagrams illustrating examples of routing blockages before and after application of a rule-based extension, according to some embodiments.
Figure 9:
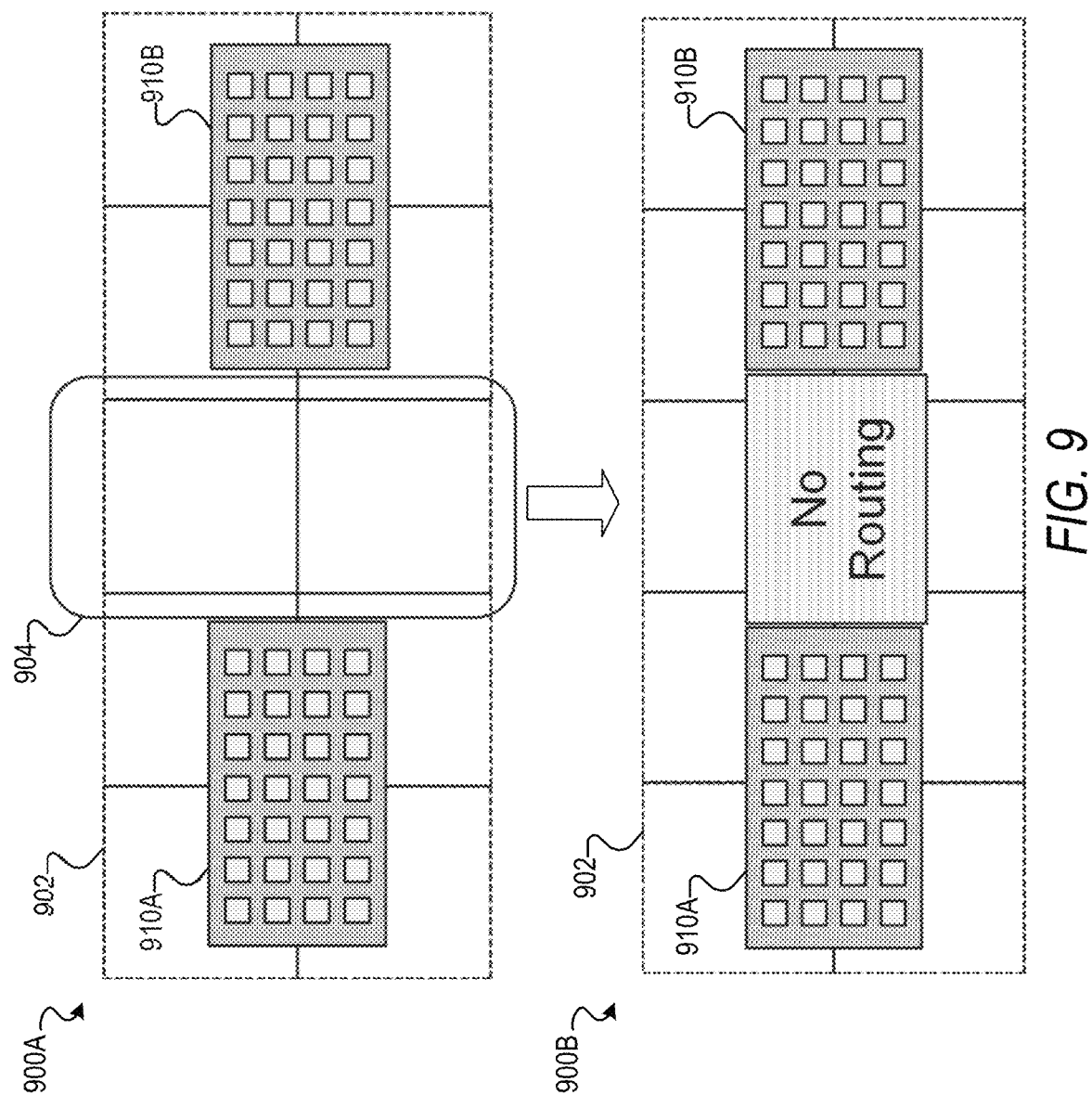

FIGS. 8 and 9 are diagrams illustrating examples of routing blockages before and after application of a rule-based extension, according to some embodiments. Depending on the embodiment, the application of the blockage extension can be performed by the method 200 of FIG. 2 or the method 300 of FIG. 3. Referring now to FIG. 8, portion 800A of a circuit design is illustrated prior to merger of an existing set of routing blockages of the circuit design on an individual layer of the circuit design. The portion 800A comprises a grid cells (Gcells) 802, and routing blockages 810A, 810B, 820A, 820B within those grid cells 802. The routing blockages 810A, 810B, 820A, 820B can represent small power grid (PG) routing blockages. Portion 800B of the circuit design represents portion 800A after application of an embodiment described herein. In particular, an embodiment can determine that the routing blockage 810A can be merged with the routing blockage 810B, and that the routing blockage 820A can be merged with the routing blockage 820B. Accordingly, an embodiment can merge the routing blockages 810A and 810B by adjusting routing capacity of grid cells 804 between the routing blockages 810A and 810B such that a routing process (e.g., routing engine) avoids routing a wire (or wire segment) of a network of a circuit design through the area in between the routing blockages 810A and 810B. Likewise, an embodiment can merge the routing blockages 820A and 820B by adjusting routing capacity of grid cells 804 between the routing blockages 820A and 820B such that a routing process (e.g., routing engine) avoids routing a wire (or wire segment) of a network of a circuit design through the area in between the routing blockages 820A and 820B.

Referring now to FIG. 9, portion 900A of a circuit design is illustrated prior to merger of an existing set of routing blockages of the circuit design on an individual layer of the circuit design. The portion 900A comprises a grid cells (Gcells) 902, and routing blockages 910A, 910B within those grid cells 902. The routing blockages 910A, 910B can represent large power grid (PG) routing blockages. Portion 900B of the circuit design represents portion 900A after application of an embodiment described herein. In particular, an embodiment can determine that the routing blockage 910A can be merged with the routing blockage 910B and, accordingly, can merge the routing blockages 910A and 910B by adjusting routing capacity of grid cells 904 between the routing blockages 910A and 910B such that a routing process (e.g., routing engine) avoids routing a wire (or wire segment) of a network of a circuit design through the area in between the routing blockages 910A and 910B.

FIG. 10 is a diagram illustrating an example of applying a rule-based blockage extension to two existing routing blockages, according to some embodiments. In particular, an embodiment can merge routing blockages 1010A, 1010B on an i-th layer ($L_i$) of a circuit design in response to determining that a distance (represented by DIST) between the routing blockage 1010A and the routing blockage 1010B is less than a determined extension value ($D_{EXT}(L_i)$) determined for i-th layer ($L_i$). Routing blockages 1020A, 1020B on the i-th layer ($L_i$) of the circuit design can be merged for a similar reason.

Figure 11:
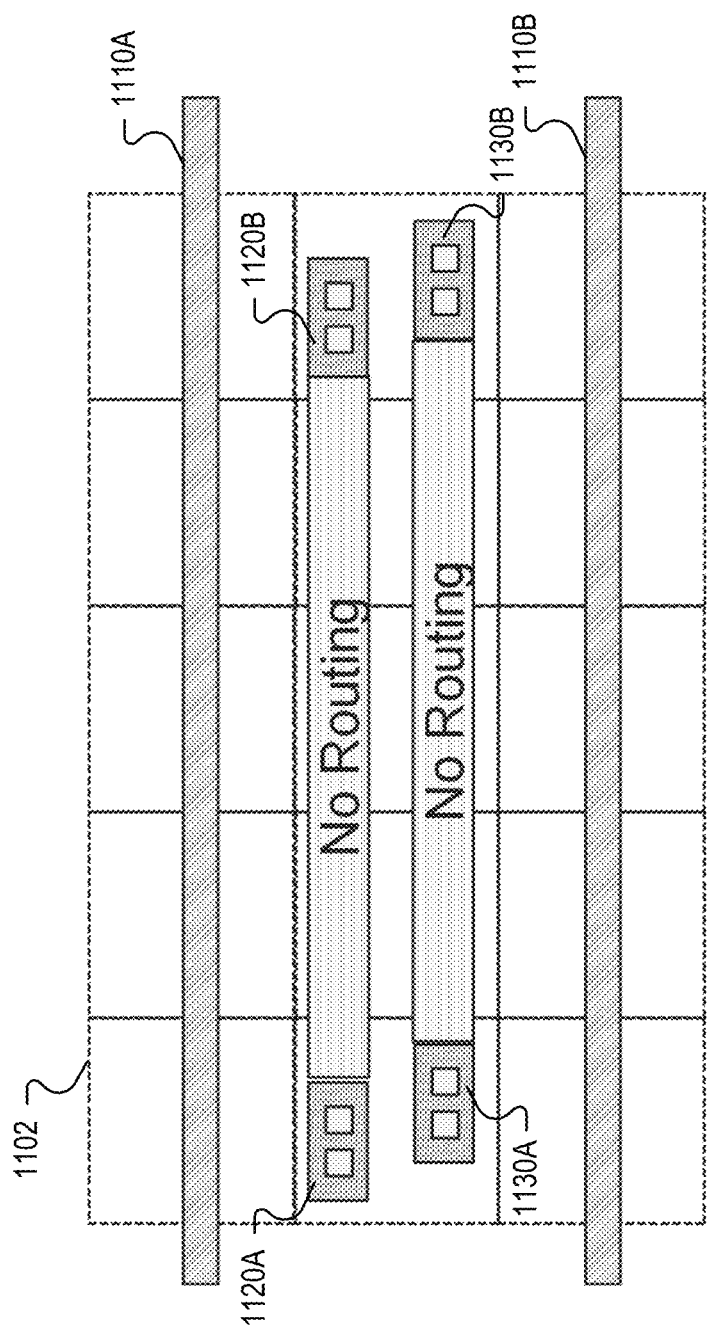
FIG. 11 is a diagram illustrating an example of routed networks that results from application of a rule-based blockage extension to two existing blockages, according to some embodiments.

FIG. 11 is a diagram illustrating an example of routed networks that results from application of a rule-based blockage extension to two routing blockages, according to some embodiments. In particular, FIG. 11 illustrates grid cells 1102 that comprise routed networks 1110A and 1110B generated by a routing process (e.g., routing engine) after application of a rule-based blockage extension to routing blockages 1120A and 1120B, and application of a rule-based blockage extension to routing blockages 1130A and 1130B, in accordance with some embodiments. As shown, the routed networks 1110A and 1110B represent straight-routed networks generated by a routing process as a result of using various embodiments described herein.

Figure 12:
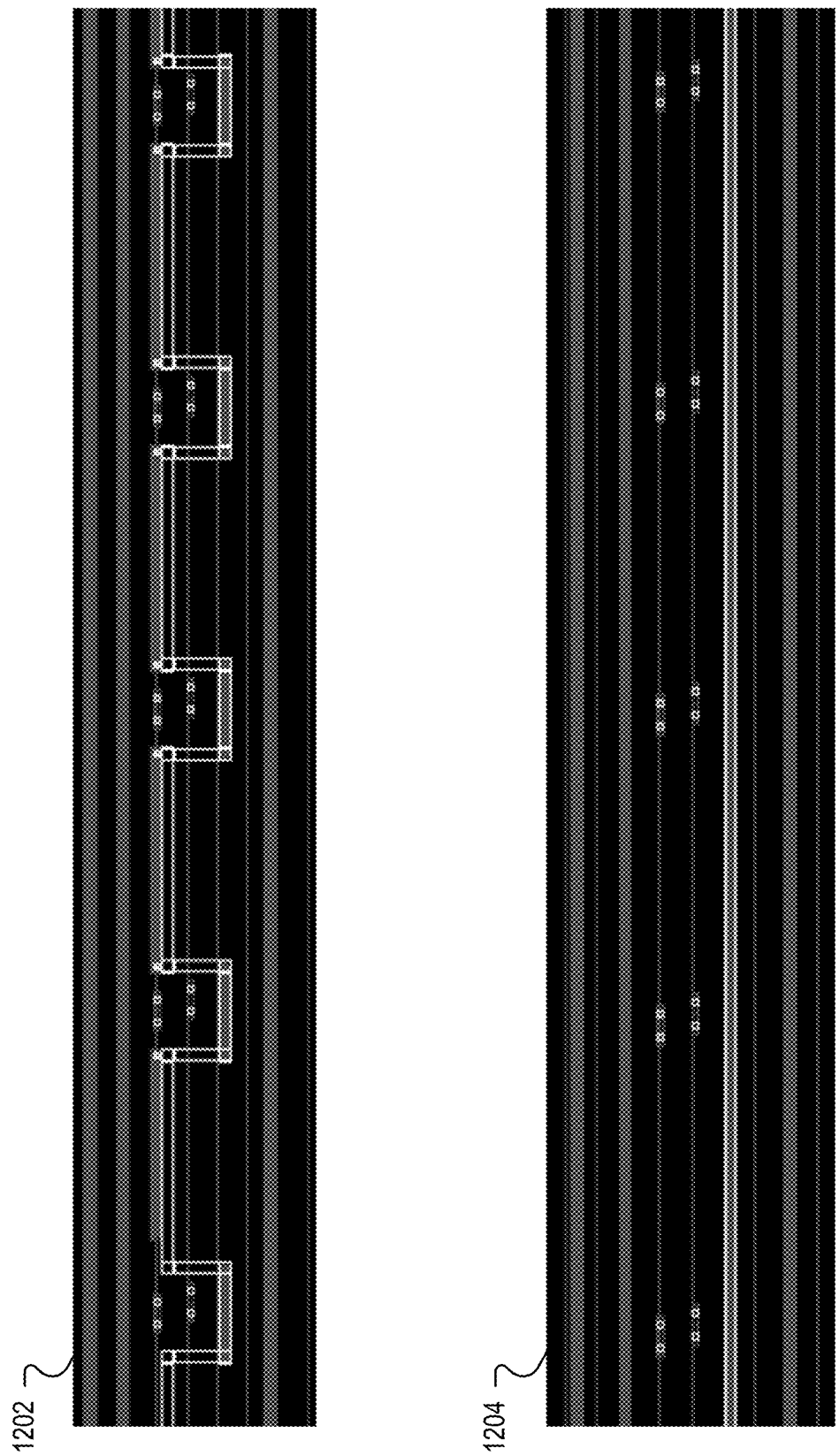
FIG. 12 illustrates a comparison between an example network routed using an embodiment described herein and the same example network routed using a conventional methodology.

FIG. 12 illustrates a comparison between an example network 1202 routed using an embodiment described herein and the same example network 1204 routed using a conventional methodology. As shown, with use of the embodiment, the example network 1202 results in straighter routed wires. In contrast, the example network 1204 (routed using the conventional methodology) comprises zig-zag routed wires.

Figure 13:
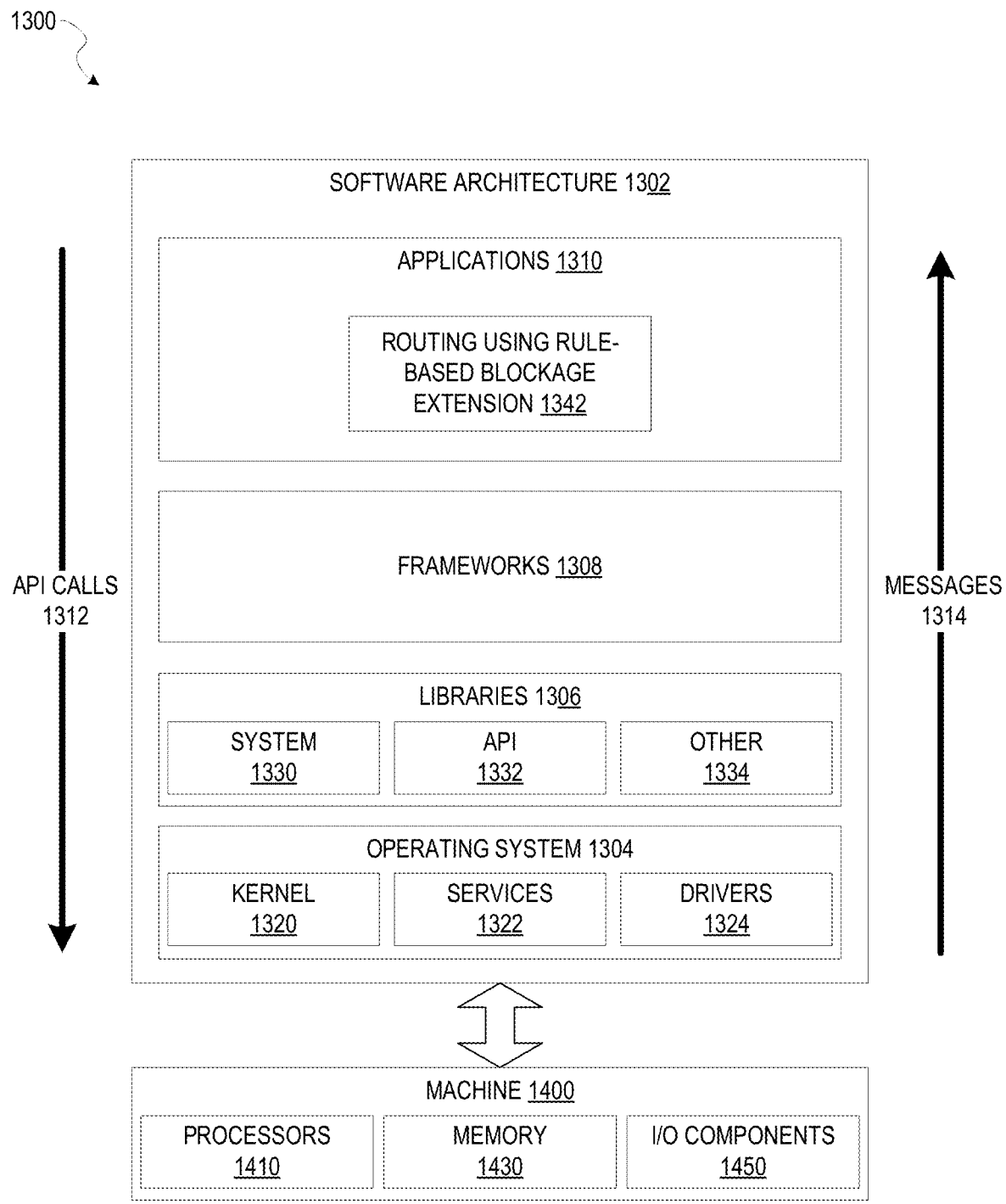
FIG. 13 is a block diagram illustrating an example of a software architecture that may be operating on an electronic design automation (EDA) computing device and may be used with methods for routing a net of a circuit design using rule-based routing blockage extension, according to some embodiments.

FIG. 13 is a block diagram 1300 illustrating an example of a software architecture 1302 that may be operating on an EDA computer and may be used with methods for circuit design routing (e.g., routing a network of a circuit design) using rule-based routing blockage extension, according to some example embodiments. The software architecture 1302 can be used as an EDA computing device to implement any of the methods described above. Aspects of the software architecture 1302 may, in various embodiments, be used to store circuit designs, and to route a circuit design using rule-based routing blockage extension in an EDA environment to generate circuit designs, from which physical devices may be generated.

FIG. 13 is merely a non-limiting example of a software architecture 1302, and it will be appreciated that many other architectures can be implemented to facilitate the functionality described herein. In various embodiments, the software architecture 1302 is implemented by hardware such as a machine 1400 of FIG. 14 that includes processors 1410, memory 1430, and I/O components 1450. In this example, the software architecture 1302 can be conceptualized as a stack of layers where each layer may provide a particular functionality. For example, the software architecture 1302 includes layers such as an operating system 1304, libraries 1306, software frameworks 1308, and applications 1310. Operationally, the applications 1310 invoke application programming interface (API) calls 1312 through the software stack and receive messages 1314 in response to the API calls 1312, consistent with some embodiments. In various embodiments, any client device, any server computer of a server system, or any other device described herein may operate using elements of the software architecture 1302. An EDA computing device described herein may additionally be implemented using aspects of the software architecture 1302, with the software architecture 1302 adapted for operating to perform routing a net of a circuit design in any manner described herein.

In one embodiment, an EDA application of the applications 1310 performs circuit design routing using rule-based routing blockage extension according to embodiments described herein using various modules within the software architecture 1302. For example, in one embodiment, an EDA computing device similar to the machine 1400 includes the memory 1430 and the one or more processors 1410. The processors 1410 also implement a routing using rule-based routing blockage extension module 1342 for routing a network of a circuit design (net routing) using rule-based routing blockage extension in accordance with various embodiments described herein.

In various other embodiments, rather than being implemented as modules of the one or more applications 1310, the routing using rule-based routing blockage extension module 1342 may be implemented using elements of the libraries 1306, the operating system 1304, or the software frameworks 1308.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionalities. The services 1322 can provide other common services for the other software layers. The drivers 1324 are responsible for controlling or interfacing with the underlying hardware, according to some embodiments. For instance, the drivers 1324 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1306 provide a low-level common infrastructure utilized by the applications 1310. The libraries 1306 can include system libraries 1330 such as libraries of blocks for use in an EDA environment or other libraries that can provide functions such as memory allocation functions, string manipulation functions, mathematic functions, and the like. In addition, the libraries 1306 can include API libraries 1332 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1306 may also include other libraries 1334.

The software frameworks 1308 provide a high-level common infrastructure that can be utilized by the applications 1310, according to some embodiments. For example, the software frameworks 1308 provide various graphic user interface (GUI) functions, high-level resource management, high-level location services, and so forth. The software frameworks 1308 can provide a broad spectrum of other APIs that can be utilized by the applications 1310, some of which may be specific to a particular operating system 1304 or platform. In various embodiments, the systems, methods, devices, and instructions described herein may use various files, macros, libraries, and other elements of an EDA design environment to implement circuit design routing using rule-based routing blockage extension as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 1302, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. The methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1400 including processors 1410), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1400, but deployed across a number of machines 1400. In some example embodiments, the processors 1410 or processor-implemented modules are located in a single geographic location (e.g., within a home environment, an office environment, or a server farm). In other example embodiments, the processors or processor-implemented modules are distributed across a number of geographic locations.

Figure 14:
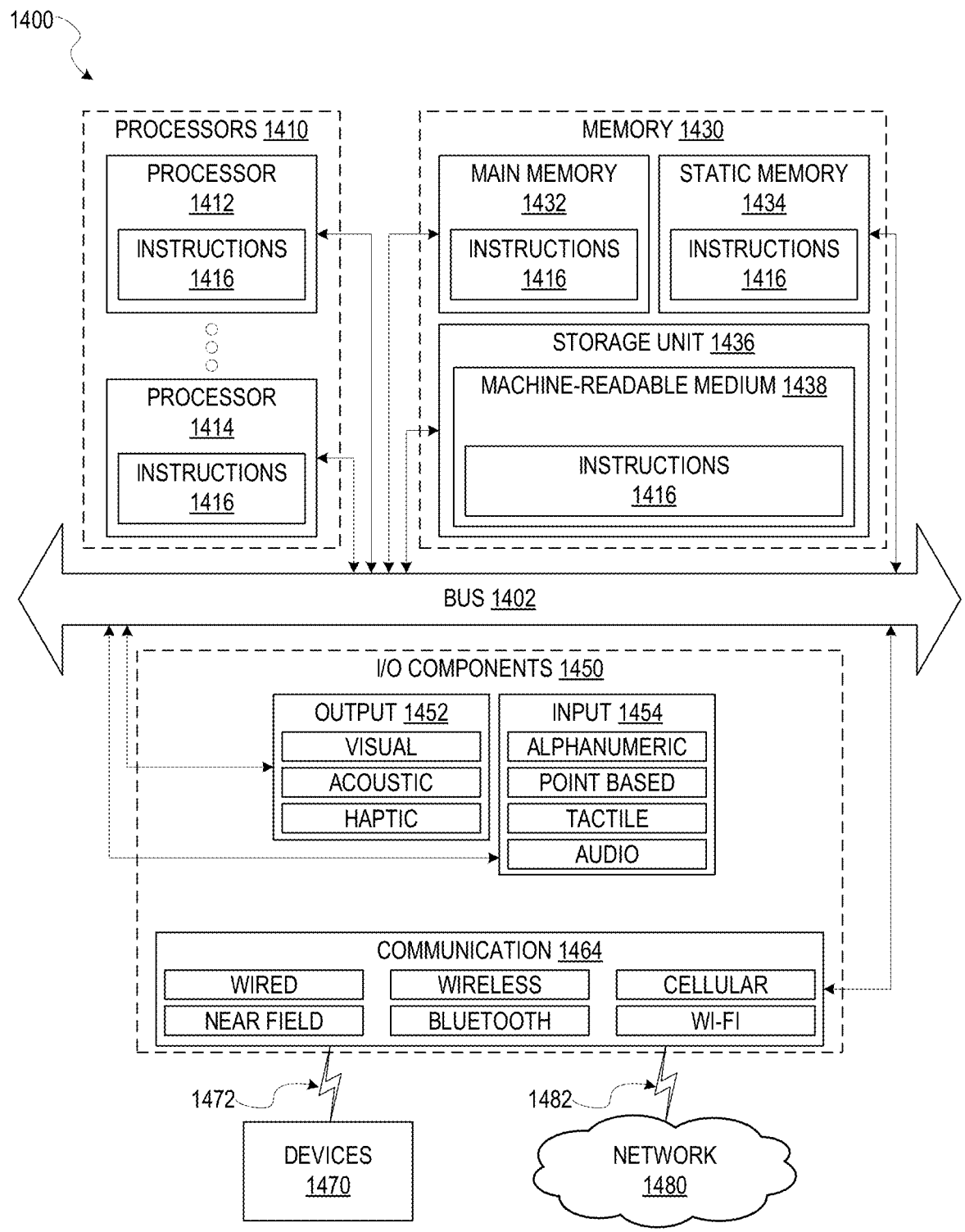
FIG. 14 is a diagram representing a machine in the form of a computer system within which a set of instructions are executed, causing the machine to perform any one or more of the methods discussed herein, according to some example embodiments.

FIG. 14 is a diagrammatic representation of the machine 1400 in the form of a computer system within which a set of instructions may be executed for causing the machine 1400 to perform any one or more of the methodologies discussed herein, according to an example embodiment. FIG. 14 shows components of the machine 1400, which is, according to some embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein can be executed. In alternative embodiments, the machine 1400 operates as a standalone device or can be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 can comprise, but not be limited to, a server computer, a client computer, a personal computer (PC), a tablet computer, a laptop computer, a netbook, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

In various embodiments, the machine 1400 comprises processors 1410, memory 1430, and I/O components 1450, which can be configured to communicate with each other via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1412 and a processor 1414 that may execute the instructions 1416. The term "processor" is intended to include multi-core processors 1410 that may comprise two or more independent processors 1412, 1414 (also referred to as "cores") that can execute the instructions 1416 contemporaneously. Although FIG. 14 shows multiple processors 1410, the machine 1400 may include a single processor 1412 with a single core, a single processor 1412 with multiple cores (e.g., a multi-core processor 1412), multiple processors 1410 with a single core, multiple processors 1410 with multiple cores, or any combination thereof.

The memory 1430 comprises a main memory 1432, a static memory 1434, and a storage unit 1436 accessible to the processors 1410 via the bus 1402, according to some embodiments. The storage unit 1436 can include a machine-readable medium 1438 on which are stored the instructions 1416 embodying any one or more of the methodologies or functions described herein. The instructions 1416 can also reside, completely or at least partially, within the main memory 1432, within the static memory 1434, within at least one of the processors 1410 (e.g., within the processor's cache memory), or any suitable combination thereof, during execution thereof by the machine 1400. Accordingly, in various embodiments, the main memory 1432, the static memory 1434, and the processors 1410 are considered machine-readable media 1438.

As used herein, the term "memory" refers to a machine-readable medium 1438 able to store data temporarily or permanently and may be taken to include, but not be limited to, random-access memory (RAM), read-only memory (ROM), buffer memory, flash memory, and cache memory. While the machine-readable medium 1438 is shown, in an example embodiment, to be a single medium, the term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., the instructions 1416) for execution by a machine (e.g., the machine 1400), such that the instructions, when executed by one or more processors of the machine (e.g., the processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1450 include a wide variety of components to receive input, provide output, produce output, transmit information, exchange information, capture measurements, and so on. In general, it will be appreciated that the I/O components 1450 can include many other components that are not shown in FIG. 14. The I/O components 1450 are grouped according to functionality merely for simplifying the following discussion, and the grouping is in no way limiting. In various example embodiments, the I/O components 1450 include output components 1452 and input components 1454. The output components 1452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1454 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or another suitable device to interface with the network 1480. In further examples, the communication components 1464 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1470 may be another machine or any of a wide variety of peripheral devices (e.g., a peripheral device coupled via a USB).

In various example embodiments, one or more portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling.

Furthermore, the machine-readable medium 1438 is non-transitory (in other words, not having any transitory signals) in that it does not embody a propagating signal. However, labeling the machine-readable medium 1438 "non-transitory" should not be construed to mean that the machine-readable medium 1438 is incapable of movement; the machine-readable medium 1438 should be considered as being transportable from one physical location to another. Additionally, since the machine-readable medium 1438 is tangible, the machine-readable medium 1438 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A non-transitory computer-readable medium comprising instructions that, when executed by a hardware processor of a device, cause the device to perform operations comprising:
   accessing circuit design data describing an existing set of routing blockages on an individual layer of a circuit design;
   determining a dimension extension value for the individual layer based on a set of design rules for the circuit design;
   generating an updated set of routing blockages on the individual layer by applying the dimension extension value for the individual layer to at least one routing blockage in the existing set of routing blockages on the individual layer, the applying of the dimension extension value to the at least one routing blockage in the existing set of routing blockages comprising merging two or more routing blockages within the existing set of routing blockages by:
      identifying, in the existing set of routing blockages on the individual layer, a series of routing blockages where adjacent routing blockages in the series are aligned and within a distance of the dimension extension value; and
      merging together the series of routing blockages to form a merged routing blockage in the updated set of routing blockages on the individual layer; and
   routing a network of the circuit design based on the updated set of routing blockages on the individual layer.

2. The non-transitory computer-readable medium of claim 1, wherein the circuit design data describes another existing set of routing blockages on another layer of the circuit design, and wherein the operations comprise:
   determining a dimension extension value for the other layer based on a set of design rules for the circuit design, the dimension extension value for the other layer is different from the dimension extension value for the individual layer; and
   generating another updated set of routing blockages on the other layer by applying the dimension extension value for the other layer to at least one routing blockage in the other existing set of routing blockages on the other layer, the network being routed further based on the updated set of routing blockages on the other layer.

3. The non-transitory computer-readable medium of claim 1, wherein the determining of the dimension extension value for the individual layer based on the set of design rules for the circuit design comprises:
   determining a minimum extension value for the individual layer based on the set of design rules; and
   determining the dimension extension value for the individual layer based on the minimum extension value and a predetermined multiplier.

4. The non-transitory computer-readable medium of claim 3, wherein the predetermined multiplier is provided by a user.

5. The non-transitory computer-readable medium of claim 3, wherein the determining of the minimum extension value for the individual layer based on the set of design rules comprises:
   determining the minimum extension value based on a minimum area of the individual layer and a wire width for the individual layer, the set of design rules defining at least one of the minimum area of the individual layer or the wire width for the individual layer.

6. The non-transitory computer-readable medium of claim 1, wherein the merging of the two or more routing blockages within the existing set of routing blockages comprises:
   prior to the identifying of the series of routing blockages, generating a sorted set of routing blockages on the individual layer by sorting the existing set of routing blockages on the individual layer based on locations of routing blockages on the individual layer, the identifying of the series of routing blockages being performed on the sorted set of routing blockages.

7. The non-transitory computer-readable medium of claim 1, wherein the routing of the network of the circuit design on the individual layer based on the updated set of routing blockages on the individual layer comprises:
   generating a plurality of grid cells for the individual layer;

determining a set of routing capacities for the set of grid cells based on the updated set of routing blockages on the individual layer; and routing the network of the circuit design based on the updated set of routing capacities.

8. The non-transitory computer-readable medium of claim 1, wherein the existing set of routing blockages on the individual layer comprises at least one power ground blockage.

9. The non-transitory computer-readable medium of claim 1, wherein the operations comprise:

generating a routing congestion estimation for the circuit design based on the network as routed.

10. A method comprising:

accessing, by a hardware processor, circuit design data describing an existing set of routing blockages on an individual layer of a circuit design;

determining, by the hardware processor, a dimension extension value for the individual layer based on a set of design rules for the circuit design;

generating, by the hardware processor, an updated set of routing blockages on the individual layer by applying the dimension extension value for the individual layer to at least one routing blockage in the existing set of routing blockages on the individual layer, the applying of the dimension extension value to the at least one routing blockage in the existing set of routing blockages comprising merging two or more routing blockages within the existing set of routing blockages by:

identifying, in the existing set of routing blockages on the individual layer, a series of routing blockages where adjacent routing blockages in the series are aligned and within a distance of the dimension extension value; and merging together the series of routing blockages to form a merged routing blockage in the updated set of routing blockages on the individual layer; and routing, by the hardware processor, a network of the circuit design based on the updated set of routing blockages on the individual layer.

11. The method of claim 10, wherein the determining of the dimension extension value based on the set of design rules for the circuit design comprises:

determining a minimum extension value based on the set of design rules; and determining the dimension extension value based on the minimum extension value and a predetermined multiplier.

12. The method of claim 11, wherein the predetermined multiplier is provided by a user.

13. The method of claim 10, wherein the merging of the two or more routing blockages within the existing set of routing blockages comprises:

prior to the identifying of the series of routing blockages, generating a sorted set of routing blockages by sorting the existing set of routing blockages based on locations of routing blockages within the circuit design, the identifying of the series of routing blockages being performed on the sorted set of routing blockages.

14. The method of claim 10, wherein the routing of the network of the circuit design based on the updated set of routing blockages comprises:

generating, by a global routing process, a plurality of grid cells for the circuit design;

determining a set of routing capacities for the set of grid cells based on the updated set of routing blockages; and routing the network of the circuit design based on the updated set of routing capacities.

15. The method of claim 10, wherein the existing set of routing blockages comprises at least one power ground blockage.

16. The method of claim 10, comprising:

generating, by the hardware processor, routing congestion estimation for the circuit design based on the network as routed.

17. A device comprising:

a memory storing instructions; and a hardware processor communicatively coupled to the memory and configured by the instructions to perform operations comprising:

accessing circuit design data describing an existing set of routing blockages on an individual layer of a circuit design;

determining a dimension extension value for the individual layer based on a set of design rules for the circuit design;

generating an updated set of routing blockages on the individual layer by applying the dimension extension value for the individual layer to at least one routing blockage in the existing set of routing blockages on the individual layer, the applying of the dimension extension value to the at least one routing blockage in the existing set of routing blockages comprising merging two or more routing blockages within the existing set of routing blockages by:

identifying, in the existing set of routing blockages on the individual layer, a series of routing blockages where adjacent routing blockages in the series are aligned and within a distance of the dimension extension value; and merging together the series of routing blockages to form a merged routing blockage in the updated set of routing blockages on the individual layer; and routing a network of the circuit design based on the updated sets of routing blockages on the individual layer.

18. The device of claim 17, wherein the merging of the two or more routing blockages within the existing set of routing blockages comprises:

prior to the identifying of the series of routing blockages, generating a sorted set of routing blockages on the individual layer by sorting the existing set of routing blockages on the individual layer based on locations of routing blockages on the individual layer, the identifying of the series of routing blockages being performed on the sorted set of routing blockages.

19. The device of claim 17, wherein the circuit design data describes another existing set of routing blockages on another layer of the circuit design, and wherein the operations comprise:

determining a dimension extension value for the other layer based on a set of design rules for the circuit design, the dimension extension value for the other layer is different from the dimension extension value for the individual layer; and generating another updated set of routing blockages on the other layer by applying the dimension extension value for the other layer to at least one routing blockage in the other existing set of routing blockages on the other layer, the network being routed further based on the updated set of routing blockages on the other layer.

20. The device of claim 17, wherein the determining of the dimension extension value for the individual layer based on the set of design rules for the circuit design comprises:
  determining a minimum extension value for the individual layer based on the set of design rules; and
  determining the dimension extension value for the individual layer based on the minimum extension value and a predetermined multiplier.

* * * * *